United States Patent
Sugiyama et al.

[15] 3,642,510
[45] Feb. 15, 1972

[54] PROCESS FOR PREPARING TITANIUM OXIDE PIGMENT HAVING HIGH DISPERSIBILITY IN HYDROPHOBIC SYSTEMS

[72] Inventors: Iwakichi Sugiyama, Narashino-shi; Haruki Tomozuka, Tokyo, both of Japan

[73] Assignee: Matsumoto Chemical Industry Co., Ltd., Minamiyawata, Ichikawa-shi, Chiba-ken, Japan

[22] Filed: Aug. 16, 1968

[21] Appl. No.: 753,073

[30] Foreign Application Priority Data

Feb. 1, 1968 Japan.....................................43/5831

[52] U.S. Cl. ..........................106/300, 106/308 Q, 106/309, 260/78.5 T
[51] Int. Cl.............................................C09c 1/36
[58] Field of Search............................106/300, 308 O, 309; 260/78.5 T

[56] References Cited

UNITED STATES PATENTS

| | | | |
|---|---|---|---|
| 2,586,477 | 2/1952 | Niles | 260/78.5 T UX |
| 2,667,462 | 1/1954 | Wildish et al. | 260/78.5 T X |
| 2,698,264 | 12/1954 | Niles | 260/78.5 T X |
| 3,427,278 | 2/1969 | Siuta | 106/300 X |
| 3,484,261 | 12/1969 | Pratt et al. | 106/308 O |

FOREIGN PATENTS OR APPLICATIONS

| | | | |
|---|---|---|---|
| 1,413,458 | 10/1964 | France | 106/300 |
| 1,427,492 | 3/1965 | France | 106/300 |

*Primary Examiner*—James E. Poer
*Assistant Examiner*—H. M. S. Sneed
*Attorney*—Ralph E. Bucknam, Jesse D. Reingold, Robert R. Strack and Henry A. Marzullo, Jr.

[57] ABSTRACT

Titanium oxide pigments having a high dispersibility in hydrophobic systems are prepared by adding an alkali metal salt of a high molecular weight carboxyl compound to a titanium oxide slurry finely dispersed in water or an alcohol containing an aluminum salt or zinc salt to form a soap of aluminum or zinc on the surface of said titanium oxide.

12 Claims, No Drawings

3,642,510

PROCESS FOR PREPARING TITANIUM OXIDE PIGMENT HAVING HIGH DISPERSIBILITY IN HYDROPHOBIC SYSTEMS

BACKGROUND OF THE INVENTION

The present invention relates to titanium oxide pigment having a high dispersibility in nitrocellulose or acrylic resin compositions.

In general, the surface of titanium oxide is hydrophilic and therefore dispersion stability thereof in hydrophobic systems is poor. The dispersion stability comes into question usually in paints, varnishes and the like wherein titanium oxide is dispersed. Among them, nail enamels having lower viscosity than that of other general paints and varnishes, have very poor dispersion stability against titanium oxide and gives precipitates a few days after the preparation, and the color change to a remarkably different color from the desired one occurs with the lapse of time which lowers the value of the product.

In order to improve dispersion stability of titanium oxide in hydrophobic systems, various attempts have been made up to the present. They may be classified roughly into two groups.

The first one is the process wherein a so-called dispersant such as a metal soap, amine, high molecular substance or a thixotropic agent such as clay treated with a high molecular substance is added. Said additives are used since they are adsorbed on the surface of titanium oxide to improve "wetting" of the surface of the pigment and/or to form an electric double layer, to improve the viscosity of the dispersion system due to thixotropy and to retard the precipitation of the pigment. However, the full purposes are not attained frequently due to the deadsorption of the additives, influence of other additives on the resulting electric double layer and poor elevation of the viscosity.

The second process comprises the treatment of the surface of titanium oxide. Almost all commercially available titanium oxide has the surface treated with aluminum, silicon or zinc compounds for the purpose of improving its dispersibility and weather resistance. However, such treatment with an inorganic compound gives quite insufficient dispersion improvement when hydrophobic solutions, in particular nail lacquers, are used.

Another process has been investigated wherein a metal ion such as aluminum ion is adsorbed on the surface of titanium oxide pigment in aqueous solution and then an alkali metal salt of a fatty acid such as oleic acid and stearic acid or of a sulfuric acid ester or phosphoric acid ester derived from the fatty acid is added thereto to form an insoluble metal salt of said acids on the surface of titanium oxide. However, those attempts do not give sufficient dispersibility in all systems in actual use, though they are successful for converting the surface of titanium oxide to an hydrophobic surface. Especially in solvents such as nail lacquer or resinous composition systems practical value is hardly observed.

An object of the present invention is to improve dispersibility of titanium oxide in resinous composition systems such as nail lacquers.

Another object of the present invention is to provide a process for preparing titanium oxide pigment having a high dispersibility in usual nitrocellulose, acrylic resin or other synthetic and natural resin compositions.

After the investigation and discussion on said conventional processes, the inventors have found that the second process wherein the treatment is effected with fatty acid salts etc., although it is excellent, necessitates (1) making the organic chain thereof longer and (2) making the chain composed of only methylene bonds of a fatty acid more compatible with nitrocellulose and acrylic resin compositions since the chain has no sufficient compatibility, in order to realize excellent and durable dispersion stability in resinous composition systems such as nail lacquer.

SUMMARY OF THE INVENTION

On the basis of such findings, the inventors have found a process for improving dispersion stability for a long period in hydrophobic systems by the surface treatment of titanium oxide with a copolymer obtained by copolymerizing under special conditions an acrylic ester or mixture of an acrylic ester and less than 70 molar percent of a methacrylic ester and an unsaturated dibasic acid or a derivative thereof.

Carboxyl compounds used in the present invention are polyacrylic esters or copolymers of an acrylic ester and methacrylic ester containing on the average one carboxyl radical or two adjacent carboxyl radicals (the two adjacent carboxyl radicals may form an acid anhydride) in a molecule.

In introducing carboxyl radical into a high molecular chain of a polyacrylic ester, the acrylic ester monomer is copolymerized with a monomeric acid or acid anhydride having a carboxyl radical. However as a result of the investigation, it has been found that for synthesizing high molecular weight carboxyl compounds which are preferable for use in the present invention, methacrylic acid or acrylic acid having too great copolymeric or polymeric properties is not advantageous in the preparation as a compound for introducing carboxyl radical and that unsaturated dibasic acids or acid anhydrides thereof or monoesters thereof are suitable. However, high molecular weight carboxyl compounds which meet the above conditions cannot be obtained only by using such unsaturated dibasic acids. It cannot be said that any molecular amount of high molecular carboxylic compound is satisfactory. In order to improve dispersibility by treating pigment surface under the conditions of the present invention, the molecular weight of the high molecular carboxyl compounds must be within a suitable range.

DETAILED DESCRIPTION

According to the present invention, it is necessary to use a solvent having comparatively large chain transfer constant in order to suitably control the amount of carboxyl radical and molecular weight of such high molecular weight carboxyl compounds, and also to suitably choose the molar ratio of the solvent to polymeric monomer. For instance, in using a certain amount of an acrylic ester or mixture of a methacrylic ester and acrylic ester, against a certain amount of an unsaturated dibasic acid, if the copolymerization is carried out with a small molar ratio of solvent/monomer, the average polymerization degree increases too much thereby increasing the copolymer molecules having a great number of carboxyl radicals, thus failing to obtain the desired high molecular carboxyl compounds. On the contrary, when the molar ratio (solvent/monomer) is too large, the resulting molecular weight is too small, larger part of polymers has no carboxyl radical at all and even the copolymers having carboxyl radical(s) have no improved dispersion stability due to their too short organic chains. Thus, polymers having various molecular weights and carboxyl concentrations may be obtained by modifying the relative amounts of the unsaturated dibasic salts or their derivatives and the solvents having a large chain transfer constant. Only by suitably choosing their amounts, high molecular carboxyl compounds which satisfy the above conditions can be synthesized.

The molecular weight of high molecular weight carboxyl compounds capable of remarkably improving the dispersion stability is one showing a viscosity in the range of about 10–200 centistokes (25° C.), preferably about 25–100 centistokes, in 50 percent methylisobutylketone solution.

As solvents having a large chain transfer constant, usable in the present invention, there may be mentioned toluene, methylethylketone, methylisobutylketone, isobutanol, isopropyl alcohol or lactic esters such as methyl lactate and ethyl lactate.

In the case of solvents other than lactic esters, the amount of solvents to be used is 1–8 moles per 1 mole of monomers containing carboxyl radicals such as unsaturated dibasic acids.

In case of lactic esters, 0.3-4 moles of the solvents are used per 1 mole of monomers.

Unsaturated dibasic acids or derivatives thereof used in the present invention are maleic acid, itaconic acid, fumaric acid and their monoesters and anhydrides. The monoesters are the compounds shown by the following formula:

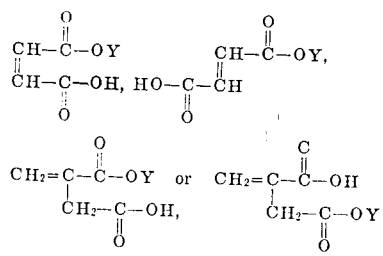

In the above formulas, Y represents

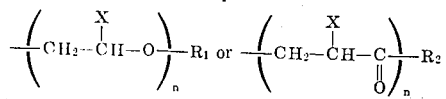

wherein $n$ is 0 or 1, X is an hydrogen atom or methyl radical and $R_1$ and $R_2$ are an alkyl radical having one to eight carbon atoms or benzyl radical with the proviso that when $n$ is 1, $R_1$ may be phenyl radical.

The above unsaturated dibasic acid or its derivative is copolymerized in an amount of 0.3-10 molar percent, based on an acrylic ester monomer such as an acrylic acid ester.

The present invention also involves the technique wherein an unsaturated dibasic acid in the form of the acid anhydride is copolymerized with an acrylic ester, thereafter one carboxyl radical is reacted with a suitable alcohol, glycol, aminoalcohol, primary amine or secondary amine to obtain a monoester or monoamide derivative, which is then used for the surface treatment of titanium oxide.

Acrylic and methacrylic ester used in the present invention are represented by the following general formula:

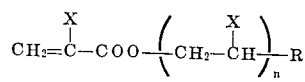

wherein X is hydrogen or methyl radical, $n$ is 0 or 1, R is an alkyl or benzyl radical when $n$ is 0 and R is OH,

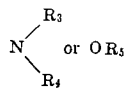

when $n$ is 1, $R_3$ and $R_4$ being same or different alkyl radicals having one to four carbon atoms and $R_5$ being an alkyl radical. Such acrylic esters or methacrylic esters may be used in the form of a mixture.

In the polymerization using monomers and solvents according to the present invention, there is no special limitation for usable polymerization initiators. Usually benzoyl peroxide, etc., may be used, but dialkyl compounds such as di-tert. butyl peroxide and perester compounds such as tert. butyl peracetate are especially preferable. The amount of the initiator may be more than 0.1 percent based on the monomer, and usually is around 1 percent.

The reaction temperature is 60°-180° C., generally the reaction is carried out at the boiling point of a solvent used or at a temperature slightly lower than the boiling point. The period of the reaction is favorably longer than 3 hours, usually 8 hours. The reaction is carried out in usual polymerization reaction apparatus under a nitrogen gas stream.

From thus synthesized high molecular carboxyl compounds, alkali salt solutions are made by using alcoholic caustic potash or alkali metal alcoholates by removing or not removing the reaction solvents and adding or not adding an alcohol having two or more carbon atoms and miscible with water such as ethanol or isopropyl alcohol.

Titanium oxide is added to water or a solvent miscible with water such as ethanol, isopropyl alcohol, tert. butanol, cellosolve, methyl cellosolve or butyl cellosolve or such a solvent containing water to make a slurry, then an aluminum or zinc salt partially soluble in an alcohol or soluble in water such as aluminum nitrate, or zinc is added to titanium oxide in an amount $10^{-4} - 10^{-2}$ mole per 100 g. of titanium oxide and the mixture is subjected to suitable means such as ball mill or sand mill to make a fine dispersion and simultaneously the aluminum compound or zinc compound is adsorbed on the surface of the pigment. Titanium oxide is quite dispersible and finely divisible in such an alcohol or water slurry. Said alkali salt solution of a high molecular weight carboxyl compound is added to the finely divided slurry to form the metal salt. In this procedure, the alkali salt solution of the high molecular carboxyl compound is added in the amount required so that the added metal compound forms a monosoap, disoap or mixture thereof. The water content is preferably less than the limit so that the high molecular carboxyl compound dissolves therein to make transparent solution.

Thereafter the necessary amount of alcoholic caustic potash solution or alkali metal alcoholate is added therein to completely neutralize the hydrochloride or nitrate, and the product is washed with water to remove the resulting potassium nitrate, sodium chloride, sodium nitrate or potassium chloride. When the resulting treated pigment is in powdery state, it is dried without any aftertreatment, but when a pasty product is obtained, it is subjected to the final treatment of azeotropic dehydration by dissolving it in a suitable azeotropic solvent such as toluene, xylene or butyl acetate.

The following examples further illustrate the present invention, without, however, limiting the invention in any way. Unless otherwise stated, the parts are by weight.

EXAMPLE 1

7.2 parts of monoethyl maleate (5 molar percent of monomer), two-thirds as much as the total 121.5 parts of n-butylacrylate (95 molar percent) and 177 parts of ethyl lactate are charged in a usual reaction apparatus provided with stirring device, reflux pipe, nitrogen gas introducing device, thermometer and monomer dropping device. The mixture is heated under stirring, while nitrogen gas is introduced. Maintaining the temperature of the solution at 130°-140° C., monomer solution composed of the remaining one-third amount of n-butylacrylate and 2 parts of di-tert. butyl peroxide is added therein dropwise during three hours. The reaction is continued for additional five hours at a temperature to obtain a high molecular carboxyl compound of 42 percent resin, to be used for the treatment. 50 Percent methylisobutylketone (MIBK) solution of the polymer showed about 25 centistokes at 25° C. 8.1 Parts of 42 percent solution of the polymer is neutralized with N/2 alcoholic caustic potash solution to make a potassium salt solution.

Separately 60 parts of titanium oxide (a product of du Pont, R900), 40 parts of isopropyl alcohol and 0.25 part of Al(NO₃)₃ 9H₂O are charged in a ball mill and finely divided to make a slurry adsorbed with aluminum salt.

The potassium salt solution of high molecular carboxyl compound is added to the slurry to form the aluminum soap, to which is then added alcoholic N/2 KOH solution to neutralize it. After washing with water and drying, the treated titanium oxide in powdery form is obtained.

One gram of said treated titanium oxide was charged in a sedimentation pipe of 1.3 cm. inside diameter, and the sedimentation velocity was determined at room temperature by adding 1 ml. of 1 percent butyl acetate solution of Toluidine Red nitrocellulose color chip (a product of Taihei Chemical Co.) and adding butylacetate to make the total amount 20 ml. The velocity thus determined was 0.92 ml./day, which suggests excellent dispersibility. On the other hand, nontreated pigment precipitates within 10 minutes.

EXAMPLE 2

According to the analogous manner and apparatus to those in Example 1, the reaction is carried out using 62.8 parts of n-butylacrylate (98 molar percent), 1.44 parts of monoethylmaleate (2 molar percent), 50 parts of methylisobutyl ketone and 1 part of tert. peracetate at the boiling point of methylisobutylketone for 8 hours to obtain 56.2 percent solution of high molecular carboxyl compound to be used for the treatment. The 50 Percent methylisobutylketone solution of the polymer has about 50 centistokes at 25° C. To 15.2 parts of 56.2 percent solution of the polymer, 15.2 parts of isopropyl alcohol are added to obtain mixed alcohol-MIBK solution. The solution is neutralized with one-half N alcoholic caustic potash solution to make the potassium salt solution. The resulting solution is added to 100.25 parts of slurry of titanium oxide dispersed and adsorbed under the same condition as in Example 1 to form the aluminum soap, which is then neutralized with the calculated amount of one-half N caustic potash alcohol solution, washed with water and dried to complete the treatment. The sedimentation velocity was determined in the same manner as in Example 1 to obtain the value of 0.58 ml./day.

EXAMPLE 3

In the same manner and apparatus as in Example 1, 58.9 parts of n-butylacrylate (92 molar percent), 1.44 parts of monoethyl maleate (2 molar percent), 3.9 parts of 2-ehtyl-hydroxymethacrylate (6 molar percent) and 1 part of tert. butyl peracetate are reacted by using 50 parts of MIBK under the same condition as in Example 2 to obtain 56.2 percent solution of high molecular carboxyl compound to be used for the treatment. The 50 percent MIBK solution of the polymer has viscosity of about 100 centistokes at 25° C. From 15.2 parts of the 56.2 percent solution of the polymer, potassium salt solution in MIBK is made in the same manner as in Example 2. The solution is added in 100.25 parts of titanium oxide slurry finely dispersed under the same condition as in Example 1, to obtain the aluminum metal salt, which is then neutralized with one-half N alcoholic caustic potash solution, washed with water and dried. The treated pigment has the sedimentation velocity of 0.92 ml./day, determined in the same manner as in Example 1.

EXAMPLE 4

63.4 Parts of n-butylacrylate, 0.49 part of maleic anhydride and 1 part of tert. butyl peracetate are reacted by using 50 parts of MIBK in the same manner as in Example 1 under the same condition as in Example 2. The solid content of the polymer solution was 56.2 percent. 50 Percent solution of the polymer in MIBK has a viscosity of about 35 centistokes at 25° C. 15.2 Parts of the 56.2 percent solution of the polymer is neutralized with one-half N alcoholic caustic potash solution in the same manner as in Example 1 to make the alkali salt solution. The solution is added to 100.25 parts of the same titanium oxide slurry as in Example 1 to form an aluminum soap, which is then neutralized with the calculated amount of one-half N caustic potash-alcohol solution, washed with water and dried. The sedimentation velocity of the product was 0.52 ml./day.

EXAMPLE 5

To 30.4 parts of 56.2 percent MIBK solution of the polymer synthesized in Example 4, 0.08 part of monoethanol amine is added and then the whole is heated to 100° C. for 30 minutes. The reaction mixture is cooled to room temperature and neutralized with one-half N caustic potash-alcohol solution in the same manner as in the preceding example to make the potassium salt solution. The potassium salt solution is added to 100.25 parts of the same slurry as that of Example 1 to form the aluminum salt, which is then neutralized with one-half N caustic potash-alcohol solution, washed with water and dried in the same manner as in the preceding example. The sedimentation velocity of the product was 0.9 ml./day.

EXAMPLE 6

In the same manner as in Example 1, 63.4 parts of n-butylacrylate, 0.49 part of maleic anhydride and 75 parts of methyl isobutylketone (MIBK) are polymerized by using 1 part of tert-butylperacetate. The viscosity of the polymer solution at 25° C. was about 50 centistokes. To 66 parts of the copolymer solution, 4 parts of n-butyl alcohol are added and the mixture is subjected to the reaction at 110°-114° C. for 1 hour to obtain the half ester. The half ester solution is neutralized with one-half N caustic potash-alcohol solution. To 60 parts of titanium oxide (R900), 100 parts of isopropyl alcohol is added and the mixture is finely divided in a ball mill for 30 hours, to which is then added 0.4 parts of $Al(NO_3)_3 \cdot 9H_2O$ and the dispersion is continued for additional 3 hours. To the titanium oxide slurry, the alkali salt solution of said half-esterified high molecular carboxyl compound is added. The whole is heated to 50° C. and reacted for 4 hours. After neutralizing the solution with one-half N caustic potash-alcohol solution, water is added therein to precipitate the pasty dispersion treatment product. To the product, 150 parts of n-butylactate are added to make the solution which is then dehydrated azeotropically. The resulting dispersion showed quite excellent dispersibility. The sedimentation velocity at high concentration as in Example 1 was 0.25 ml./day.

We claim:

1. A process for preparing titanium dioxide pigments of high dispersibility in hydrophobic systems which comprises the steps of:
   1. preparing a salt solution of a high molecular weight compound containing free carboxyl groups, the monoester or the monoamide thereof, of viscosity between 10 and 200 centistokes at 25° C. in 50 percent methylisobutyl ketone solution, said compound being a copolymer of an acrylic acid ester and an unsaturated dibasic acid of four to five carbon atoms or a monoester or acid anhydride thereof, in the proportion of 0.3–10 mole percent of said unsaturated dibasic acid, based on the molar proportion of said acrylate ester,
   2. adding said solution from step 1 to a titanium dioxide slurry in water or in a solvent miscible with water, said slurry additionally containing an aluminum nitrate in the amount of $10^{-4}$ to $10^{-2}$ mole per 100 g. of titanium dioxide whereby the aluminum salt of said copolymer is formed on the surface of the titanium dioxide,
   3. washing and drying.

2. The process according to claim 1 wherein said acrylic acid ester has formula:

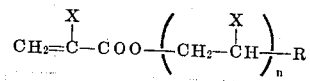

wherein X is hydrogen or methyl, $n$ is zero or 1, R is alkyl or benzyl when $n$ is zero and R is OH,

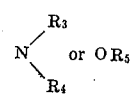

when $n$ is 1, $R_3$ and $R_4$ are the same or different alkyl of one to four carbon atoms and $R_5$ is alkyl.

3. The process according to claim 1 wherein said unsaturated dibasic acid or monoester or acid anhydride thereof contains between four and five carbon atoms.

4. The process according to claim 1 wherein said copolymerization is carried out in a solvent of large chain transfer constant.

5. The process according to claim 1 wherein the viscosity of said high molecular weight carboxyl compound is between 25 and 100 centistokes.

6. The process according to claim 4 wherein the solvent is toluene or methylethylketone, methylisobutylketone, isobutanol, isopropyl alcohol in the proportion of 1 to 8 moles per mole of said unsaturated dibasic acid or a lactic acid ester in the proportion of 0.3 to 4 moles per mole of said unsaturated dibasic acid.

7. The process according to claim 1 wherein said unsaturated dibasic acid or monoester or acid anhydride thereof is maleic or fumaric or itaconic acid, a monoester or anhydride thereof, said monoester containing the grouping

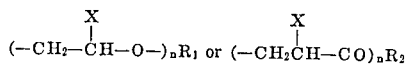

wherein $n$ is 0 or 1, X is H or $-CH_3$, $R_1$ and $R_2$ are alkyl of one to eight carbon atoms or benzyl and wherein when $n$ is 1, $R_1$ is alkyl of one to eight carbon atoms or phenyl or benzyl.

8. The process according to claim 1 wherein said acrylic acid ester consists of a methacrylate ester in a proportion of less than 70 mole percent.

9. The process according to claim 1 wherein said salt of said high molecular weight compound is an alkali salt.

10. The process according to claim 1 wherein said high molecular weight compound is in the form of a monoester of monoamide obtained by reacting said compound containing free carboxyl groups with an alcohol, a glycol, an aminoalcohol, a primary or a secondary amine.

11. A process according to claim 1, characterized in that the high molecular weight carboxyl compound is a copolymer obtained by polymerizing an alkylacrylate and 0.3–10 molar percent, based on the alkylacrylate, of maleic anhydride in the presence of 1–8 moles of methylisobutylketone per each mole of the monomers.

12. A process according to claim 10, characterized in that the high molecular weight carboxyl compound is a copolymer of the half-ester or half-amide type obtained by polymerizing an alkyl acrylate and 0.3–10 molar percent, based on the alkylacrylate, of maleic anhydride in the presence of 1–8 moles of methylisobutylketone per each mole of the monomers and then treating the resulting product with an alcohol or an aminoalcohol.

* * * * *